United States Patent
Gormley (10) Patent No.: US 9,068,532 B2
(45) Date of Patent: Jun. 30, 2015

(54) TRANSLATING SLEEVE THRUST REVERSER WITH MOVABLE CASCADE

(71) Applicant: Rohr, Inc., Chula Vista, CA (US)

(72) Inventor: Timothy Gormley, Bonita, CA (US)

(73) Assignee: Rohr, Inc., Chula Vista, CA (US)

( * ) Notice: Subject to any disclaimer, the term of this patent is extended or adjusted under 35 U.S.C. 154(b) by 0 days.

(21) Appl. No.: 13/949,952

(22) Filed: Jul. 24, 2013

(65) Prior Publication Data

US 2014/0027536 A1  Jan. 30, 2014

Related U.S. Application Data

(60) Provisional application No. 61/675,281, filed on Jul. 24, 2012.

(51) Int. Cl.
| | | |
|---|---|---|
| *F02K 1/64* | (2006.01) | |
| *F02K 1/70* | (2006.01) | |
| *F02K 1/72* | (2006.01) | |

(52) U.S. Cl.
CPC .... *F02K 1/70* (2013.01); *F02K 1/72* (2013.01)

(58) Field of Classification Search
CPC .......... F02K 1/56; F02K 1/563; F02K 1/566; F02K 1/605; F02K 1/625; F02K 1/70; F02K 1/72
USPC .................. 60/226.1–226.3, 230; 244/110 B; 239/265.23
See application file for complete search history.

(56) References Cited

U.S. PATENT DOCUMENTS

| | | | | |
|---|---|---|---|---|
| 3,601,992 A * | 8/1971 | Maison | ........................ | 60/226.2 |
| 3,831,376 A * | 8/1974 | Moorehead | .................. | 60/226.2 |
| 3,981,451 A * | 9/1976 | Prior et al. | ............... | 239/265.31 |
| 4,005,822 A * | 2/1977 | Timms | ..................... | 239/265.31 |
| 4,807,434 A * | 2/1989 | Jurich | ......................... | 60/226.2 |
| 4,823,547 A * | 4/1989 | Newton | ...................... | 60/226.2 |
| 5,706,649 A * | 1/1998 | Robinson et al. | ........... | 60/226.2 |
| 6,082,096 A * | 7/2000 | Vauchel | ...................... | 60/226.2 |
| 6,256,980 B1 * | 7/2001 | Lecordix et al. | ............. | 60/226.2 |
| 8,201,390 B2 * | 6/2012 | Sternberger | ................. | 60/226.2 |
| 8,677,733 B2 * | 3/2014 | Beardsley et al. | ........... | 60/226.2 |
| 2005/0151012 A1 * | 7/2005 | Lair | ........................... | 244/110 B |
| 2010/0212286 A1 * | 8/2010 | West et al. | ................... | 60/226.2 |

* cited by examiner

*Primary Examiner* — Phutthiwat Wongwian
*Assistant Examiner* — Marc J Amar (57) ABSTRACT

A nacelle assembly for a turbofan engine includes a forward nacelle portion having an aft edge and defining a bypass duct that transports bypass airflow of the turbofan engine, a translatable sleeve that is translatable aft of the forward nacelle portion and a reverse thrust apparatus that is movable between a stowed position, and a deployed position. When the reverse thrust apparatus is deployed, the translatable sleeve is moved aft to a position away from the aft edge of the forward nacelle portion to expose a cascade assembly comprising an opening in the bypass duct, and one or more blocker doors are deployed so as to extend into the bypass duct, such that at least a portion of the airflow in the bypass duct is directed out the bypass duct through the cascade assembly. Also, during deployment of the reverse thrust apparatus, at least a portion of the cascade assembly translates toward the engine centerline. The cascade assembly may have a cross-section that is non-uniform.

13 Claims, 7 Drawing Sheets

TRANSLATING SLEEVE THRUST REVERSER WITH MOVABLE CASCADE

This application claims priority to U.S. Patent Appln. No. 61/675,281 filed Jul. 24, 2012.

BACKGROUND

Typical aircraft turbofan jet engines include an engine core, a nacelle that surrounds the engine core, and a fan that draws in a flow of air that is split into a bypass airflow and an engine core airflow. The nacelle provides a bypass duct that surrounds the engine core. The bypass airflow is transported through the bypass duct. The nacelle is configured to promote laminar flow of air through the bypass duct. The engine core includes a multi-stage compressor to compress the engine core airflow, a combustor to add thermal energy to the compressed engine core airflow, and a turbine section downstream of the combustor to produce mechanical power from the engine core airflow. The typical turbine section has two and sometimes three turbine stages. The turbine stages are used to drive the compressor and the fan. After exiting from the turbine section, the engine core airflow exits the nacelle through an exhaust nozzle at the aft end of the engine.

In a turbofan engine, the fan typically produces a majority of the thrust produced by the engine. The bypass airflow can be used to produce reverse thrust, typically employed during landing. A thrust reversing apparatus mounted in the nacelle selectively reverses the direction of the bypass airflow to generate reverse thrust. During normal engine operation, the bypass airflow may or may not be mixed with the engine core airflow exhaust prior to exiting the engine nacelle assembly. During thrust reverse operation, a translatable sleeve is moved from a stowed position to a deployed position to expose a cascade assembly, and blocker doors are deployed into the bypass duct. In this deployed position, the blocker doors redirect the airflow in the bypass duct to exit the nacelle out the cascade assembly.

A conventional cascade assembly provides reverse thrust operation, but may do so in an inefficient manner. Because of the momentum of the bypass airflow in the bypass duct, the majority of the reverse thrust is generated within the aft portion of the conventional cascade assembly. The forward portion of the cascade assembly has a "dead zone" in which relatively little of the bypass airflow is converted into reverse thrust. Thus, a majority of the bypass airflow is crowded into a relatively small area of the cascade assembly, which restricts the airflow exiting through the cascade assembly. The restricted airflow results in a reduced airflow exit velocity and, in turn, results in a reduced reverse thrust. These effects reduce the efficiency of the cascade assembly and of the engine. There is a need for an improved thrust reversing apparatus cascade assembly with improved efficiency.

SUMMARY

A nacelle assembly for a turbofan engine is disclosed. The nacelle assembly includes (a) a forward nacelle portion having an aft edge and defining a bypass duct that extends at least partially around an engine centerline of the engine, the bypass duct being configured to transport bypass airflow of the engine, and (b) a translatable sleeve having a forward edge that extends circumferentially at least partially around the bypass duct and that is translatable away from the aft edge of the forward nacelle portion, defining an outlet opening for the bypass airflow that produces a reverse thrust. When the thrust reversing apparatus is in the stowed position, the cascade assembly is positioned substantially within the nacelle and the translatable sleeve is in its far forward position such that there is no outlet opening. As the thrust reversing apparatus is moved to a deployed position, the translatable sleeve is moved aft to a position away from the aft edge of the forward nacelle portion to expose a cascade assembly comprising an opening in the bypass duct, and one or more blocker doors are deployed so as to extend into the bypass duct, such that at least a portion of the airflow in the bypass duct is directed out the bypass duct through the cascade assembly. Additionally, during deployment, at least a portion of the cascade assembly translates toward the engine centerline. Cascade assembly embodiments are disclosed that have uniform or non-uniform cross-sections with lengthened vanes in the forward portion, and an optional scoop which may be disposed toward the engine centerline.

Other features and advantages of the present invention should be apparent from the following description of the preferred embodiments, which illustrate, by way of example, the principles of the invention.

BRIEF DESCRIPTION OF THE DRAWINGS

According to common practice, the various features of the drawings discussed below are not necessarily drawn to scale. Dimensions of various features and elements in the drawings may be expanded or reduced to more clearly illustrate the embodiments of the invention.

DETAILED DESCRIPTION

In the following description, various embodiments will be described. For purposes of explanation, specific configurations and details are set forth in order to provide a thorough understanding of the embodiments. It will also be apparent to one skilled in the art that the present invention can be practiced without the specific details described herein. Furthermore, well-known features may be omitted or simplified in order not to obscure the embodiment being described.

Figure 1:
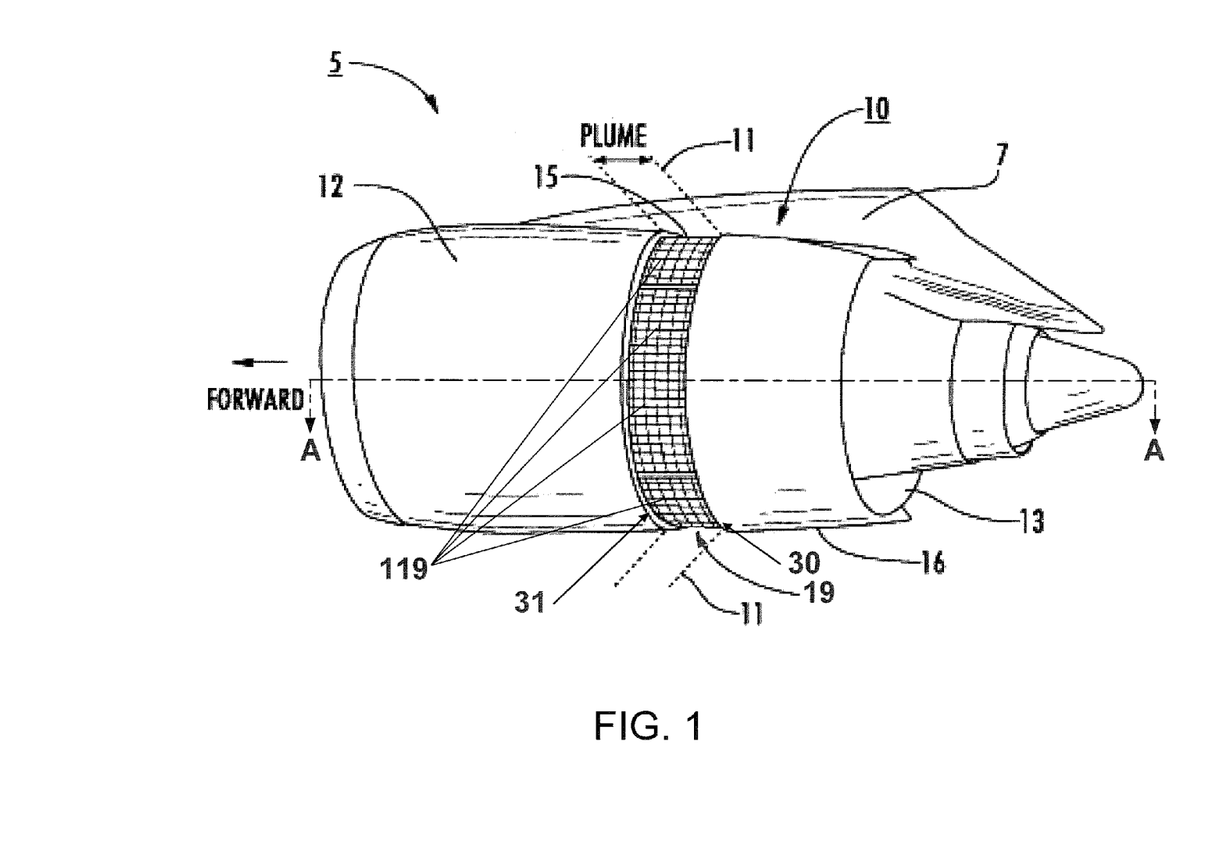
FIG. 1 illustrates an aircraft turbofan engine having a thrust reversing apparatus as disclosed herein.
Figure 13:
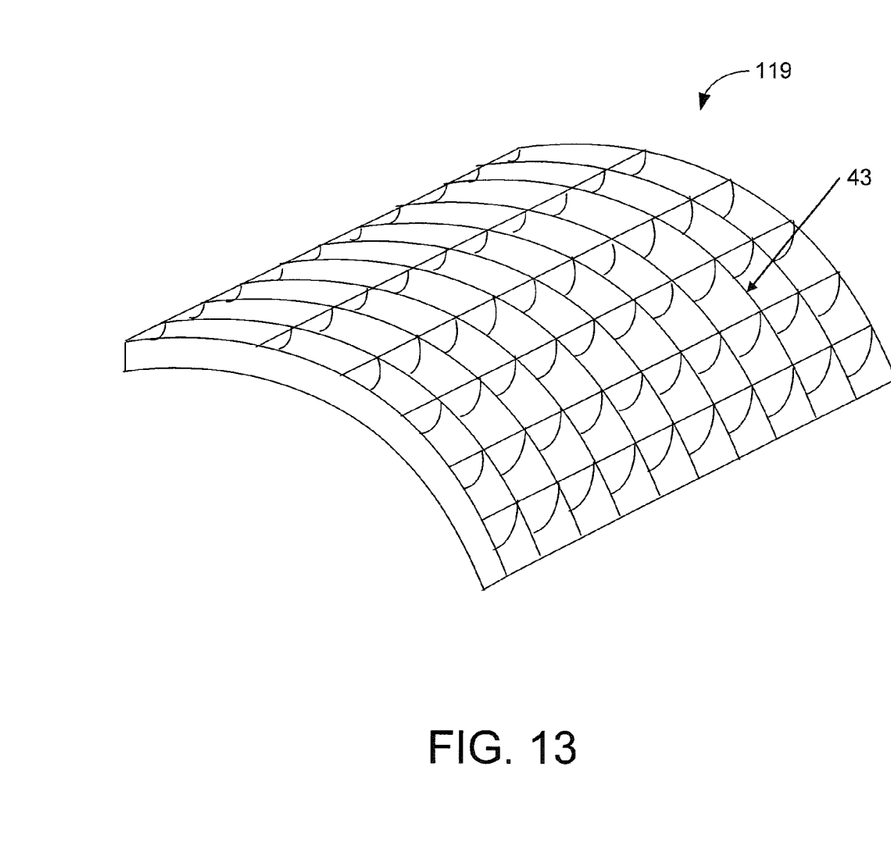
FIG. 13 is a perspective view of a cascade segment, as disclosed herein.

As shown in FIG. 1, a turbofan engine nacelle 5 can include a thrust reversing apparatus 10, illustrated in a deployed position. The nacelle is supported from an aircraft (not shown) by an engine pylon 7. The thrust reversing apparatus may include a translatable sleeve 16 that forms an aft portion of the nacelle surrounding a bypass airflow duct 13. The translatable sleeve is movably connected to an aft end of a forward portion 12 of the nacelle. When the thrust reversing apparatus is configured for normal flight operation, the translatable sleeve is positioned immediately aft of the forward portion of the nacelle (see also FIGS. 2 and 3), and confines the bypass airflow within the bypass airflow duct. When the thrust reversing apparatus is in the deployed position, the translatable sleeve is moved aft, away from the forward portion of the nacelle, thus providing an outlet opening 15 between the forward nacelle portion and the forward end of the translatable sleeve. The outlet opening typically extends on either side of the supporting engine pylon 7, and typically extends around a substantial portion of the circumference of the engine nacelle. The outlet opening exposes a cascade assembly 19. FIG. 1 shows that the cascade assembly may be comprised of multiple cascade segments 119, each segment having a forward end and an aft end. FIG. 13 shows a typical cascade segment 119 which may be arcuate in one or more dimensions. Each segment 119 includes a plurality of cascade vanes 43 configured to direct flowing air in a desired direction. The outlet opening 15 permits a plume of air 11 to be discharged from the engine's bypass airflow in order to provide reverse thrust for slowing the aircraft upon landing.

Figure 2:
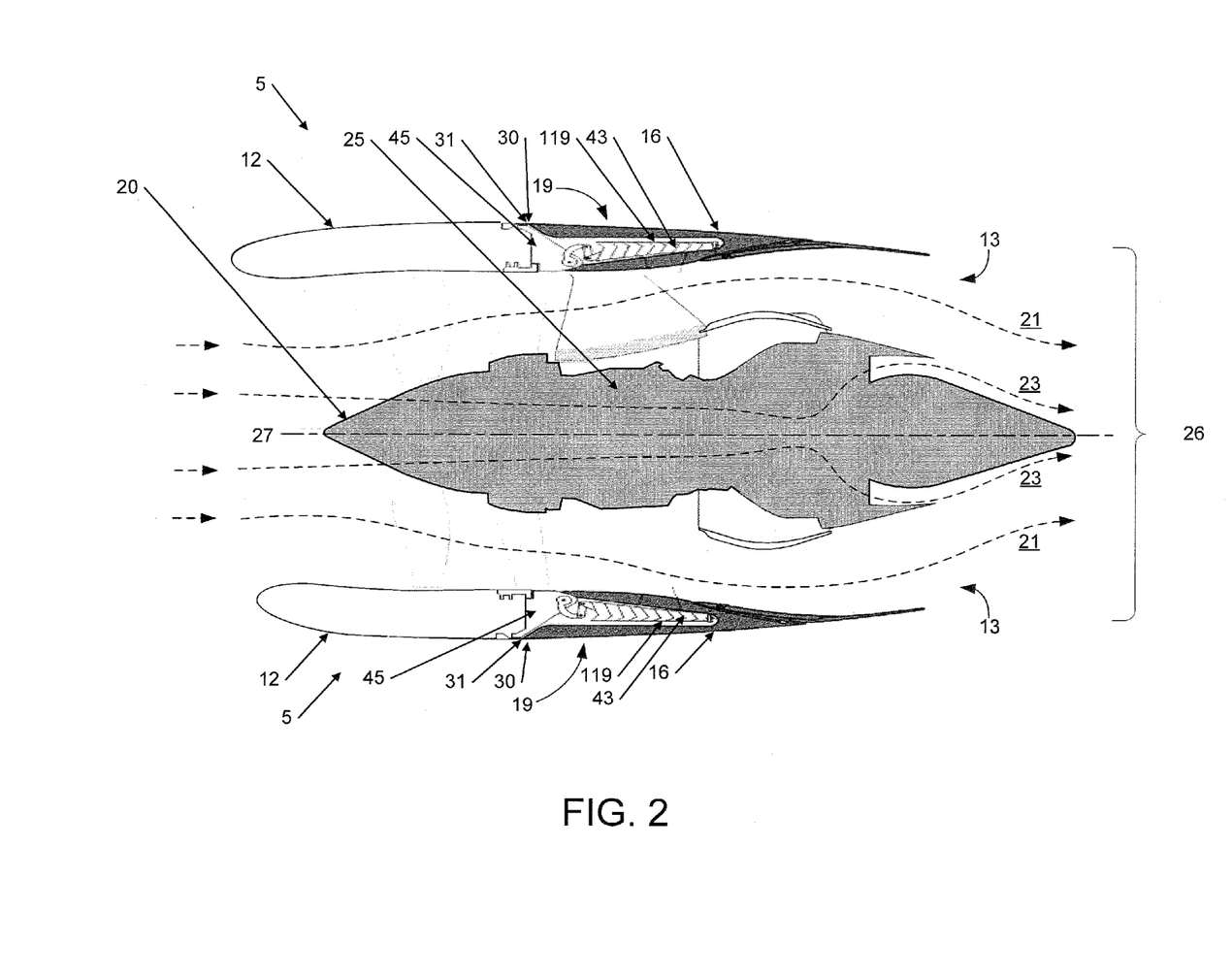
FIG. 2 is a partially schematic cross-section view through cut A-A of the turbofan engine illustrated in FIG. 1.

FIG. 2 depicts a simplified cross-section of the turbofan engine nacelle 5 as configured for normal flight operation, so that the thrust reversing apparatus 10 is shown in the stowed position. A turbofan engine 20 is illustrated within the engine nacelle. A turbofan engine is generally configured to be symmetric about an engine centerline 27. It can be seen that there are two separate airflow paths within the nacelle. A bypass airflow 21 enters the forward portion 12 of the nacelle, is accelerated by the turbofan engine's fan stage(s), then exits an aft end 26 of the nacelle. A core airflow 23 enters the forward portion of the nacelle, and as is known in the art travels through one or more compressor stages, a combustion chamber, and one or more turbine stages (collectively indicated by reference numeral 25), then exits the aft end of the nacelle 5. The cascade assembly 19 and its associated translatable sleeve 16 are depicted in the stowed position, configured for normal flight. The cross-section of FIG. 2 shows two of the circumferentially arranged cascade assemblies 19, with their associated cascade segments 119. The circumferential arrangement of the cascade segments defines a diameter of the cascade assembly.

Figure 3:
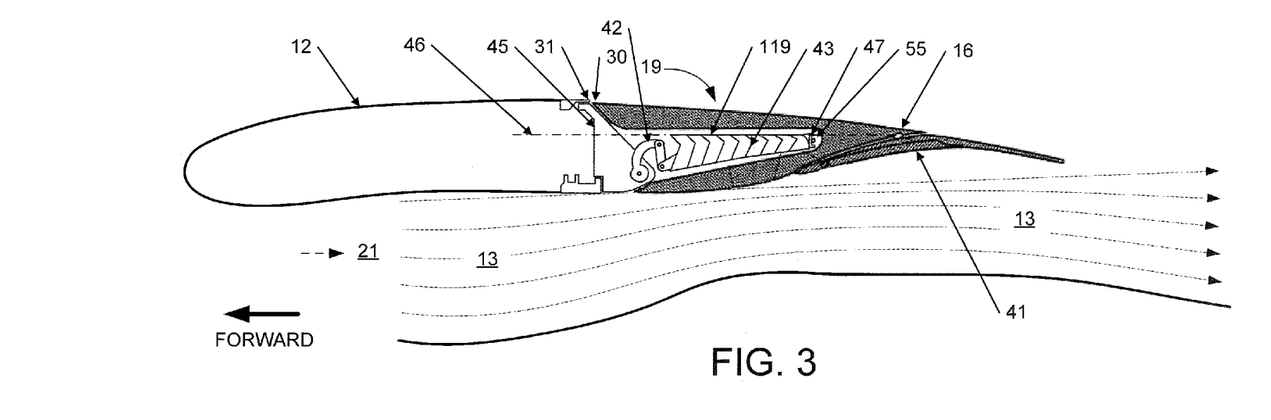
FIG. 3 is a cross-section view of a portion of a nacelle as disclosed herein with a thrust reversing apparatus in the stowed position.
Figure 4:
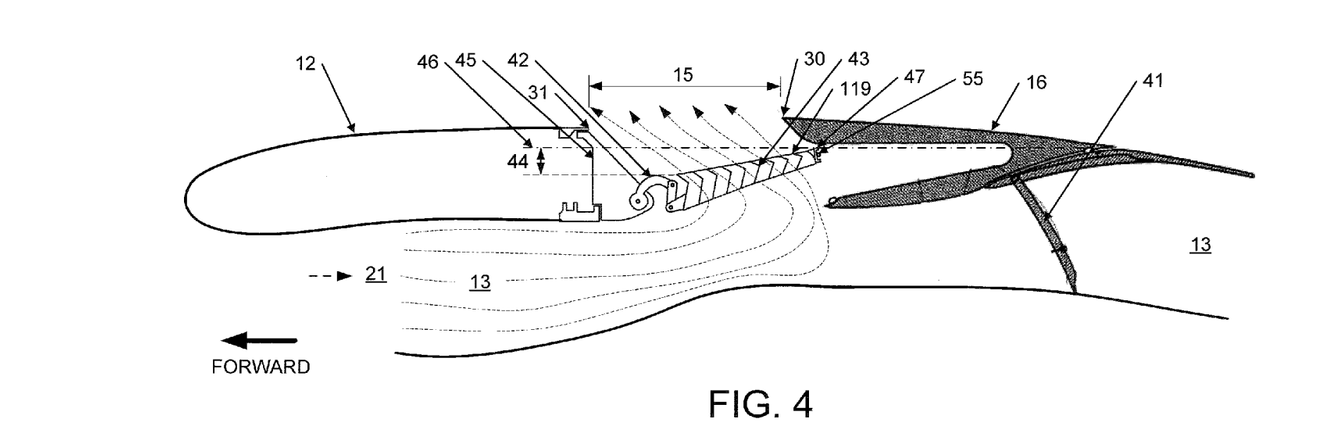
FIG. 4 is a cross-section view a portion of a nacelle as disclosed herein with a thrust reversing apparatus in the deployed position.

FIG. 3 shows the cascade assembly 19 in the stowed position, configured for normal flight. FIG. 4 shows the cascade assembly when the thrust reversing apparatus 10 is in the deployed position. Typically, as the thrust reversing apparatus (including the translatable sleeve 16) is moved to the deployed position, a plurality of blocker doors 41 are deployed to block bypass airflow 21 within the annular bypass airflow fan duct 13 from exiting through the aft end of the nacelle, and to force the bypass airflow to exit the engine nacelle through the outlet opening 15.

Comparison of FIG. 3 and FIG. 4 shows that the forward nacelle portion 12 includes an aft edge 31 and defines a bypass duct 13 that extends at least partially around a centerline 27 of the turbofan engine 20, the bypass airflow duct being configured to transport bypass airflow 21 of the turbofan engine. The translatable sleeve 16 has a forward edge 30 that extends circumferentially at least partially around the bypass airflow duct and is translatable relative to the aft edge 31 of the forward nacelle portion. The cascade assembly 19 includes a plurality of spaced vanes 43, and is movable between a stowed position and a deployed position. When in the stowed position the forward nacelle portion 12 is substantially adjacent the translatable sleeve 16 and a substantially continuous outer surface is formed extending from the forward nacelle portion to the translatable sleeve. When in the deployed position, the translatable sleeve 16 is moved aft, away from the aft edge 31 of the forward nacelle portion 12 creating an outlet opening 15, exposing the cascade assembly 19. FIG. 3 and FIG. 4 show that one or more blocker doors 41 are deployed into the bypass airflow duct, such that at least a portion of the airflow is directed out the bypass airflow duct through the cascade assembly 19. At least a portion of the cascade assembly 19 is translated toward the engine centerline 27.

In one embodiment, during the reverse thrust operation, a rotary linkage 42 moves the forward portion of the cascade assembly 19 toward the engine centerline 27 a radial distance 44 from its normal stowed location, which is depicted by a reference line 46. The rotary linkage may be attached to a stationary torque box 45 or other structure of the nacelle assembly with mechanical fasteners of a type known in the art. The rotary linkage may be powered, for example, by electrical, hydraulic, pneumatic, or mechanical actuators of a type known in the art. The rotary linkage may be powered by, for example, the same mechanism that powers the thrust reverser system, or may be powered by a separate mechanism, or may share a power source with other systems of the aircraft such as in the nacelle. The aft end of the cascade segments 119 may be pivotally affixed to an aft cascade ring 47. The aft cascade ring 47 ties the cascade segments 119 together, and stiffens the cascade assembly 19 against outward deflection. As shown in FIGS. 3 and 4, the cascade segments 119 include pluralities of spaced vanes 43 configured to turn the exiting bypass airflow to an at least partially forward direction in order to provide reverse thrust.

One of the benefits associated with translating a portion of the cascade assembly 19 radially toward the engine centerline 27 is increased reverse thrust efficiency. By translating the cascade assembly toward the engine centerline 27, into the bypass airflow duct, the airflow can be more uniformly distributed across the cascade assembly. More specifically, the forward end of the cascade assembly can be used to catch and turn a larger portion of the bypass airflow 21 resulting in more uniform distribution of bypass airflow across the cascade assembly. Without translating the cascade assembly toward the engine centerline, the majority of the bypass airflow may be "crowded" toward the aft end of the cascade assembly. Crowded airflow may result in increased pressure drop across the cascade assembly and relatively reduced reverse thrust efficiency. By translating the cascade assembly toward the bypass airflow, the bypass airflow may be more uniformly distributed across the cascade assembly, resulting in less pressure drop across the cascade assembly and improved reverse thrust efficiency. More uniform distribution of the bypass airflow across the cascade assembly may also enable the cascade assembly to be shortened (lightened) without adversely affecting its efficiency.

Figure 5:
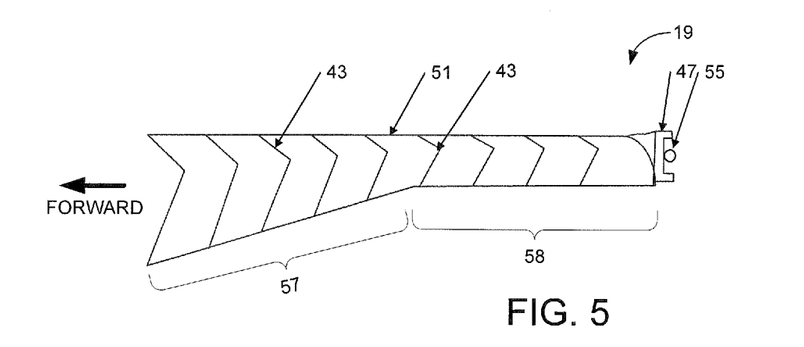
FIG. 5 is a cross-section view of a thrust reversing cascade assembly as disclosed herein.
Figure 6:
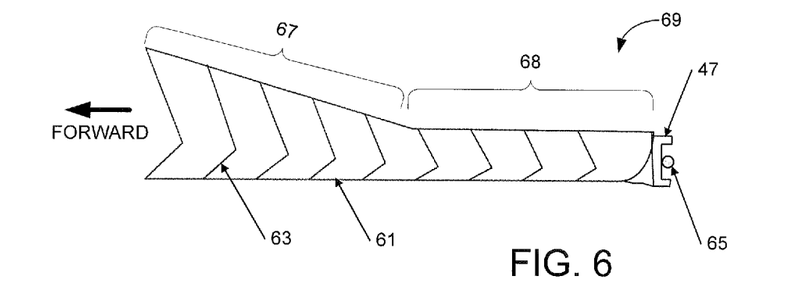
FIG. 6 is a cross-section view of a thrust reversing cascade assembly as disclosed herein.
Figure 7A:
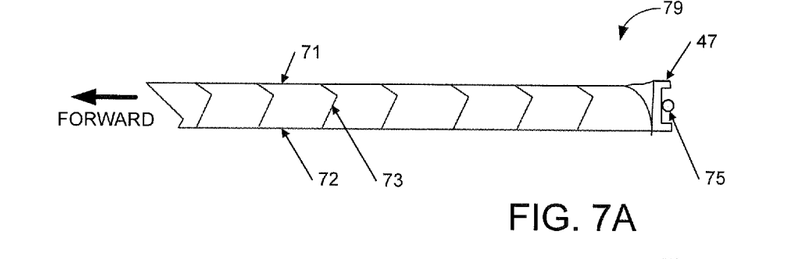
FIG. 7A is a cross-section view of a thrust reversing cascade assembly as disclosed herein.
Figure 7B:
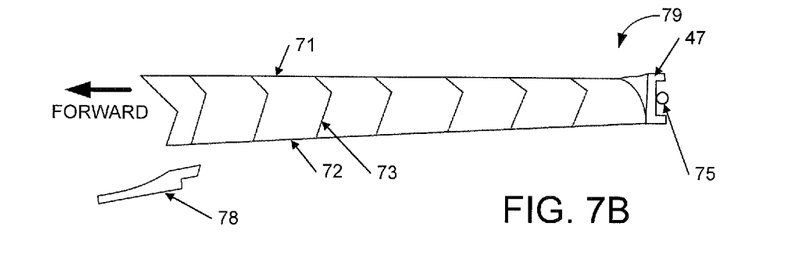
FIG. 7B is a cross-section view of a thrust reversing cascade assembly including a scoop, as disclosed herein.

FIGS. 5-7 depict various alternative embodiments of the cascade assembly 19. It is understood that these are only exemplary embodiments and that other configurations can be practiced without departing from the invention. FIG. 5 depicts a simplified cross section of the cascade assembly 19 with a relatively regular and planar top surface 51 and a relatively irregular (i.e., non-planar) bottom surface comprising at least two inclined planes 57, 58. The first aft plane 58 defines the aft bottom portion of the surface of the cascade assembly and may be relatively parallel with the top surface 51. The forward plane 57 defines the forward portion of the bottom surface and extends from the aft plane at an obtuse angle so that the depth of the cascade assembly is greater at the forward-most point and lesser toward the aft end of the cascade assembly. It will be understood by those of skill in the art that the characterization of the surfaces described above as "planar" refers to the two-dimensional depiction and the actual cascade assembly is three-dimensional wherein the planar surfaces may be arcuate or discontinuous in one or more dimensions. The cascade assembly includes an array of spaced vanes 43 configured to turn the exiting bypass airflow to an at least partially forward direction in order to provide reverse thrust. Because of the translating motion of the cascade assembly enabled by this invention, the cascade assembly may be deeper (in at least its forward portion) than alternative configurations. Increased cascade assembly depth may enable longer vanes which may result in more control over the reverse thrust plume 11. The assembly may also include a pivot mechanism 55 for securing it to the aft cascade rings 47.

FIG. 6 depicts a simplified cross-section of a cascade assembly 69 with a relatively regular and planar bottom surface 61 and relatively irregular top surface comprising at least two planes 67, 68. The aft plane 68 defines the aft portion of the top surface of the cascade assembly and may be relatively parallel with the bottom surface. The forward plane 67 defines the forward portion of the top surface and extends from the aft plane at an obtuse angle so that the depth of the cascade assembly is greater at the forward-most point and lesser toward the aft end of the cascade assembly. The cascade assembly includes an array of spaced vanes 63 configured to turn the exiting bypass airflow to an at least partially forward direction in order to provide reverse thrust. Because of the translating motion of the cascade assembly enabled by this invention, the cascade assembly may be deeper (in at least its forward portion) than alternative configurations. Increased cascade assembly depth may enable longer vanes which may result in more control over the reverse thrust plume 11. The assembly may also include a pivot mechanism 65 for securing it to the aft cascade rings 47.

FIGS. 7A and 7B depict a simplified cross section of a cascade assembly 79 with a relatively regular and planar top surface 71 and a relatively regular and planar bottom surface 72. The top surface and bottom surface may be relatively parallel with one another. The cascade assembly may include an array of spaced vanes 73 configured to turn the exiting bypass airflow to an at least partially forward direction in order to provide reverse thrust. Because of the translating motion of the cascade assembly enabled by this invention, the cascade assembly may be deeper than alternative configurations. Increased cascade assembly depth may enable longer vanes which may result in more control over the reverse thrust plume 11. The assembly may also include a pivot mechanism 75 for securing it to the aft cascade ring.

FIG. 7B depicts the cascade assembly 79 with an optional scoop 78, a relatively regular and planar top surface 71, a relatively regular and planar bottom surface 72. As depicted in FIG. 7B, the top surface and the bottom surface may not be parallel. The scoop may be fixably attached to the cascade assembly or may be attached to another structure. The scoop 78 may be disposed toward the engine centerline 27 relative to the cascade assembly and may be used to direct a portion of the bypass airflow 21 into the forward portion of the cascade assembly. As mentioned above, this may result in more uniform distribution of the airflow across the cascade assembly and increased reverse thrust efficiency. The scoop may be retracted out of the bypass airflow duct 13 when the cascade assembly is in the stowed position. Those of skill in the art recognize that the scoop may be employed by itself, or in combination with any type of cascade assembly.

Figure 8:
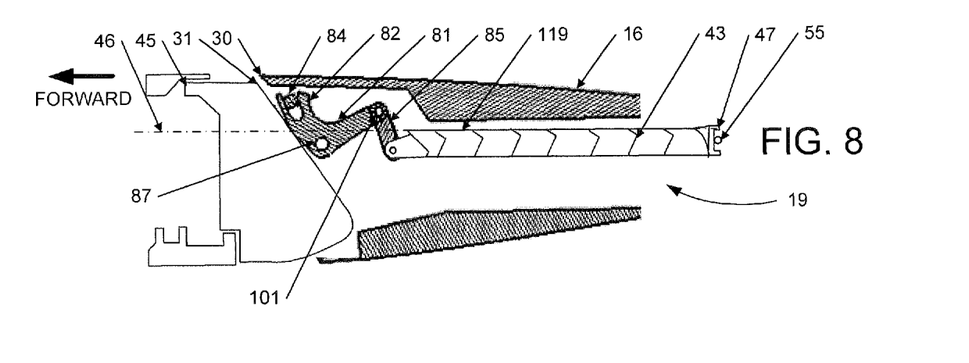
FIG. 8 is a partially schematic cross-section view of a portion of a turbofan nacelle with a cascade assembly deployment mechanism in the stowed position, as disclosed herein.
Figure 9:
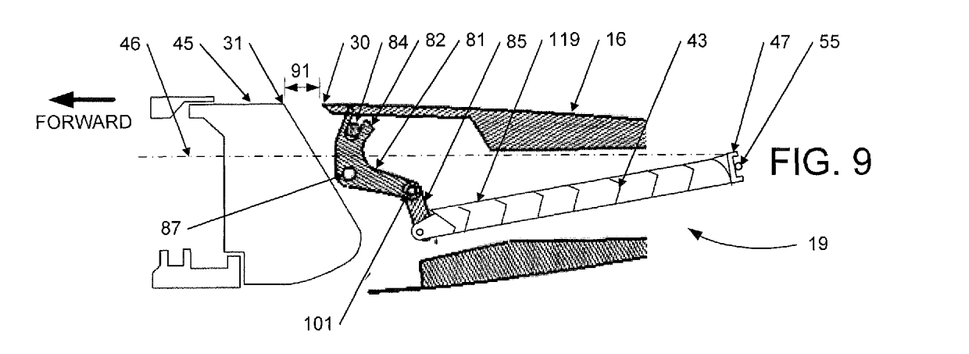
FIG. 9 is a partially schematic cross-section view of a portion of a turbofan nacelle with a cascade assembly deployment mechanism in a partially deployed condition, as disclosed herein.
Figure 10:
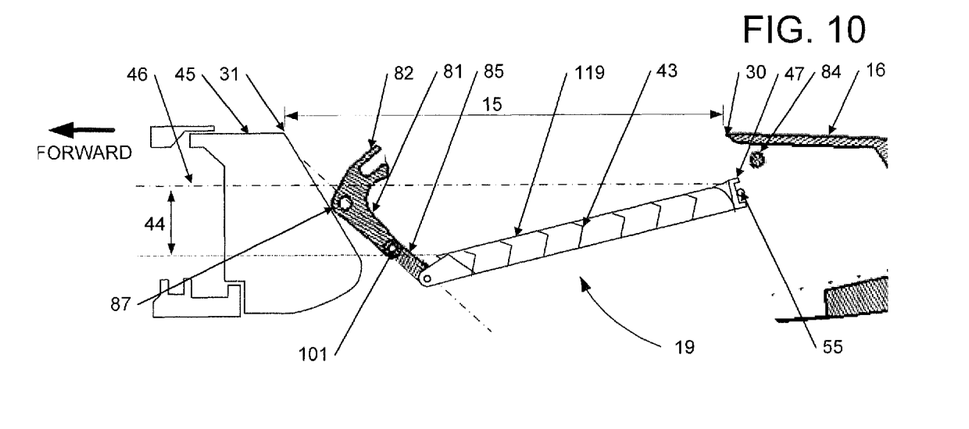
FIG. 10 is a partially schematic cross-section view of a portion of a turbofan nacelle with a cascade assembly deployment mechanism in a partially deployed condition, as disclosed herein.

FIGS. 8-10 depict another embodiment of the invention in which the cascade assembly is operably connected to the translatable sleeve 16 to translate the cascade assembly 119 toward the engine centerline 27 when the thrust reversing apparatus 10 is deployed. FIG. 8 depicts the thrust reversing apparatus in the stowed position. FIG. 9 depicts the thrust reversing apparatus partially deployed between the stowed position of FIG. 8 and the deployed position of FIG. 10. In FIG. 9, the translatable sleeve 16 is shown moved aft, creating a partial outlet opening 91. FIGS. 8-10 show that a rotable linkage 81 with a hooked arm 82 may be used to translate the cascade assembly 19 toward the engine centerline when the translatable sleeve 16 moves aft. A roller 84 may be securely attached to the translatable sleeve. As the roller 84 translates aft with the translatable sleeve 16, it causes the hooked arm 82 to rotate about a pin 87, which in turn translates a pushrod 85 and at least the forward portion of the cascade assembly 19 toward the engine centerline. The pin 87 may be rigidly affixed to the torque box 45 or other structure. FIG. 10 depicts the rotatable linkage 81 and the cascade assembly 19 in the fully deployed position. The linkage 81 may be configured to have a locking position wherein a pivot point 101 is engaged in an "over-center" position. If the linkage is thus configured, then the cascade assembly 19 is essentially locked into place and the linkage will hold it in place until the linkage is disengaged by the motion of the translatable sleeve and the roller 84 moving forward. That is, the roller 84 rotates the linkage 81 to unlock the pivot point 101 and move the linkage 81 back to the stowed position. As the translatable sleeve 16 moves forward, the roller 84 engages the hooked arm 82, which rotates, retracting the pushrod 85 and moving the cascade assembly 19 into the stowed position. Other methods, mechanisms, and modifications of this embodiment are readily apparent and well-known to those of skill in the art and may be employed for moving the cascade assembly 19 radially inwardly toward the engine centerline during a thrust reversing mode without departing from the invention.

Figure 11:
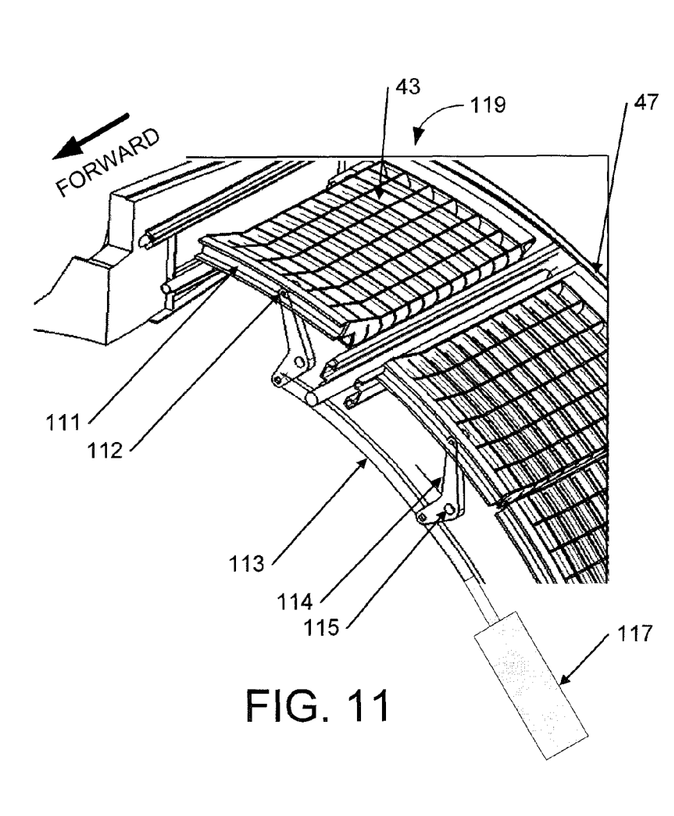
FIG. 11 is a partially schematic cross-section view of a portion of a turbofan nacelle with a cascade assembly deployment mechanism in the stowed position, as disclosed herein.
Figure 12:
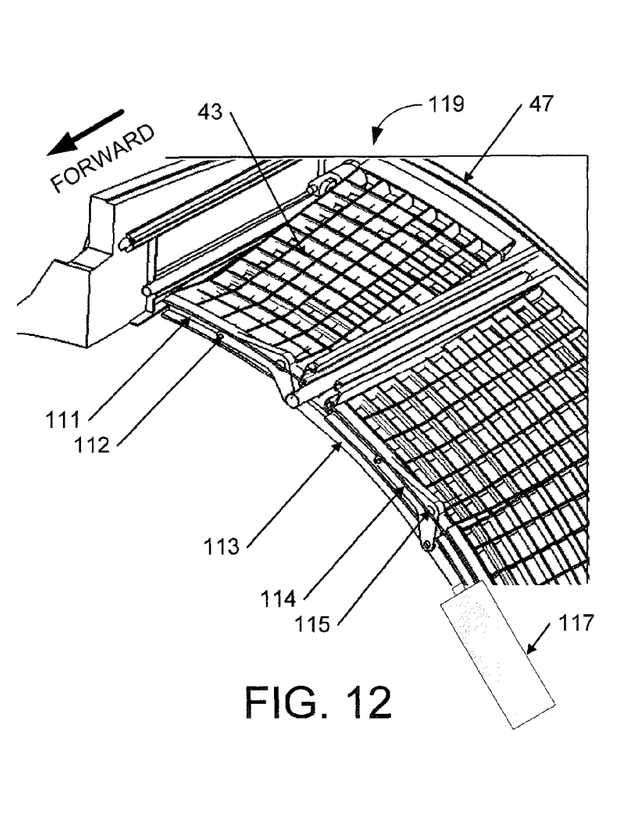
FIG. 12 is a partially schematic cross-section view of a portion of a turbofan nacelle with a cascade assembly deployment mechanism in a deployed condition, as disclosed herein.

FIG. 11 is a partially schematic perspective view of another embodiment of the invention wherein an alternative mechanism is employed to translate the cascade assembly 119 toward the engine centerline 27 when the thrust reversing apparatus 10 is deployed. FIG. 11 depicts the thrust reversing apparatus in the stowed position. The cascade assemblies translate radially inwardly by means of a translatable linkage 113. The translatable linkage 113 moves in a linear or circumferential direction relative to the engine. The linkage 113 may be moved, for example, by electrical, hydraulic, pneumatic, or mechanical actuators of a type known in the art. A linear hydraulic actuator 117 is depicted in FIG. 11. The translatable linkage 113 is attached to one or more cranks 114 which are in turn attached to one or more rollers 112, each of which are engaged in a cascade slot 111 of individual cascade segments 119. Each crank 114 may be pivotally attached to a pin 115 that may be securely fastened to the torque box or other structure (not illustrated in the Figure). When the translatable linkage 113 is moved in the clockwise direction, each crank 114 pivots about the pin 115, which translates the cascade assembly 19 toward the engine centerline 27 to the deployed (i.e., radially inward) position. The final deployed position of the cascade assembly 19 is depicted in FIG. 12. The cascade assembly 19 is returned to its stowed position in the opposite manner, wherein the translatable linkage 113 is moved in the counterclockwise direction. Other methods, mechanisms and modifications of this embodiment are readily apparent and well known to those of skill in the art and may be employed without departing from the invention.

Those skilled in the art will understand that the embodiments describe above may be used in any combination with other embodiments described herein or in combination with devices outside of this disclosure without departing from the invention. For example, any of the cascade assembly embodiments may be employed with any of the mechanisms to translate the cascade assembly, or with the optional scoop embodiment. Alternatively, any of the cascade assembly embodiments herein may be employed with an alternative translating mechanism outside of this disclosure without departing from the invention. The cascade assembly embodiments disclosed herein may be used with a wide variety of thrust reverser and nacelle constructions. For example, the disclosed cascade assembly embodiments may be used with a nacelle having a stationary forward portion, or may be used with a nacelle having a forward nacelle portion that is movable. As another example, the cascade assembly embodiments may be used with translating sleeve thrust reversers, as illustrated herein, or may be used with clamshell-type thrust reversers. As another example, the cascade assembly embodiments may be used with nacelles that include a variable area fan nozzle (VAFN) assembly, or may be used with nacelles that do not include a VAFN assembly.

Other variations are within the spirit of the present invention. Thus, while the invention is susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A thrust reverser for a turbine engine with a bypass duct, the thrust reverser comprising:
    a translating sleeve slidable between a forward stowed position and an aft deployed position; and
    a cascade assembly comprising a number of apertures through which bypass air is directed from the bypass duct in a reverse thrust direction, the cascade assembly being positioned in a stowed position when the translating sleeve is in the forward stowed position and where airflow through the apertures is blocked by the translating sleeve, and the cascade assembly being positioned in a deployed position when the translating sleeve is in the aft deployed position and where bypass air is directed through the apertures;
    wherein the cascade assembly is at least partially radially displaced inward towards an engine centerline in the deployed position as compared to the stowed position, and wherein a forward end of the cascade assembly is displaced inward towards the engine centerline relative to an aft end of the cascade assembly in the deployed position.

2. The thrust reverser of claim 1, wherein the cascade assembly includes an array of vanes that forms the at least some of the apertures.

3. The thrust reverser of claim 1, wherein the forward end of the cascade assembly is configured to move radially inward as the cascade assembly moves from the stowed position to the deployed position.

4. The thrust reverser of claim 1, wherein the forward end of the cascade assembly is configured to move in an arcuate path when as the cascade assembly transitions between the stowed position and the deployed position.

5. A thrust reverser for a turbine engine with a bypass duct, the turbine engine having a centerline about which components of the turbine engine rotate, the thrust reverser comprising:
    a translating sleeve which translates in a direction parallel to the centerline between a stowed position in which the translating sleeve blocks an opening and a deployed position in which the opening permits air to exit from inside the bypass duct;
    a cascade assembly comprising a number of cascade segments, and each cascade segment comprising a plurality of apertures, wherein when the translating sleeve is in its deployed position the apertures direct air exiting the bypass duct through the opening in a forward direction to generate reverse thrust, and wherein when the translating sleeve is in its stowed position the translating sleeve separates air from the bypass duct from the cascade assembly;

wherein a first of the cascade segments comprises a pivotable attachment mechanism at an aft end thereof, and a forward end of the first of the cascade segments is pivotable between a stowed position and a deployed position in which the forward end is closer to the engine centerline than in the stowed position.

6. The thrust reverser of claim 5, wherein the first of the cascade segments includes an array of vanes that forms the at least some of the apertures.

7. The thrust reverser of claim 5, wherein the forward end of the first of the cascade segments is configured to move radially inward as the first of the cascade segments moves from the stowed position to the deployed position.

8. The thrust reverser of claim 5, wherein the forward end of the first of the cascade segments is configured to move in an arcuate path when as the first of the cascade segments transitions between the stowed position and the deployed position.

9. The thrust reverser of claim 5, wherein in the deployed position the first of the cascade segments is moved into the bypass duct.

10. The thrust reverser of claim 5, wherein
the first of the cascade segments is operably connected to the translating sleeve; and
the movement of the translating sleeve moves the first of the cascade segments between the stowed position and the deployed position.

11. The thrust reverser of claim 5, wherein the first of the cascade segments has a relatively planar top surface and a relatively non-planar bottom surface.

12. The thrust reverser of claim 5, wherein the first of the cascade segments has a relatively planar bottom surface and a relatively non-planar top surface.

13. The thrust reverser of claim 5, further including a scoop disposed toward the centerline relative to the cascade assembly and configured to direct a portion of the air from the bypass duct into a forward portion of the cascade assembly.

* * * * *